United States Patent
Wysocki

(10) Patent No.: US 8,744,224 B2
(45) Date of Patent: Jun. 3, 2014

(54) TAPERED FIBER BUNDLE APPARATUS WITH MONITORING CAPABILITY

(75) Inventor: Paul F. Wysocki, Flemington, NJ (US)

(73) Assignee: Alcatel Lucent, Paris (FR)

( * ) Notice: Subject to any disclaimer, the term of this patent is extended or adjusted under 35 U.S.C. 154(b) by 1028 days.

(21) Appl. No.: 11/369,364

(22) Filed: Mar. 7, 2006

(65) Prior Publication Data
US 2007/0212006 A1    Sep. 13, 2007

(51) Int. Cl.
*G02B 6/26*    (2006.01)
*G02B 6/42*    (2006.01)
*G02B 6/04*    (2006.01)
*H01S 3/00*    (2006.01)
*H04B 10/25*    (2013.01)

(52) U.S. Cl.
USPC ....... 385/43; 385/115; 359/341.1; 359/341.3; 359/341.4

(58) Field of Classification Search
USPC .......................................................... 385/43
See application file for complete search history.

(56) References Cited

U.S. PATENT DOCUMENTS

| | | | |
|---|---|---|---|
| 4,896,942 A * | 1/1990 | Onstott et al. | 385/127 |
| 5,633,964 A | 5/1997 | DiGiovanni | |
| 5,731,892 A | 3/1998 | DiGiovanni | |
| 5,864,644 A * | 1/1999 | DiGiovanni et al. | 385/43 |
| 5,920,424 A | 7/1999 | Espindola | |
| 6,049,414 A | 4/2000 | Espindola | |
| 6,049,418 A | 4/2000 | Srivastava | |
| 6,104,733 A | 8/2000 | Espindola | |
| 6,141,142 A | 10/2000 | Espindola | |
| 6,195,200 B1 | 2/2001 | DeMarco | |
| 6,430,343 B1 * | 8/2002 | Arney et al. | 385/48 |
| 6,819,828 B2 * | 11/2004 | Takahashi et al. | 385/24 |
| 6,882,664 B2 | 4/2005 | Bolshtyansky | |
| 7,046,432 B2 * | 5/2006 | Starodoumov | 359/341.32 |
| 7,327,920 B2 * | 2/2008 | Dong et al. | 385/115 |

* cited by examiner

*Primary Examiner* — Uyen Chau N Le
*Assistant Examiner* — John M Bedtelyon
(74) *Attorney, Agent, or Firm* — Fletcher Yoder

(57) ABSTRACT

Systems and methods for monitoring signals in an optical fiber amplifier system are provided. The optical amplifier system includes a tapered fiber bundle which couples optical energy into the cladding of an optical amplifier. A signal passing through the optical amplifier is amplified. To monitor the amplified signal, a single fiber of a tapered fiber bundle may be used as a monitor fiber. Alternatively, a monitor or coupler may be integrated into the tapered fiber bundle during manufacturing. The systems and methods disclosed allow for monitoring the amplified signal without increasing the length of the amplified signal's path, thus minimizing the introduction of additional non-linearities.

15 Claims, 4 Drawing Sheets

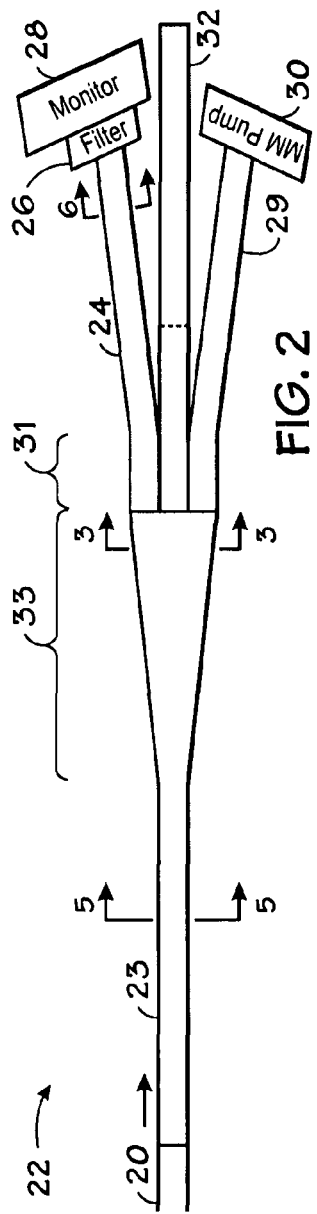
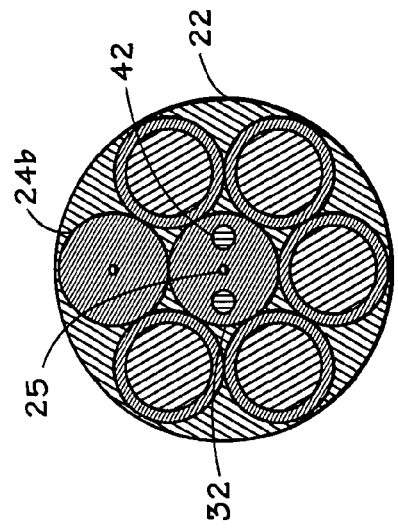
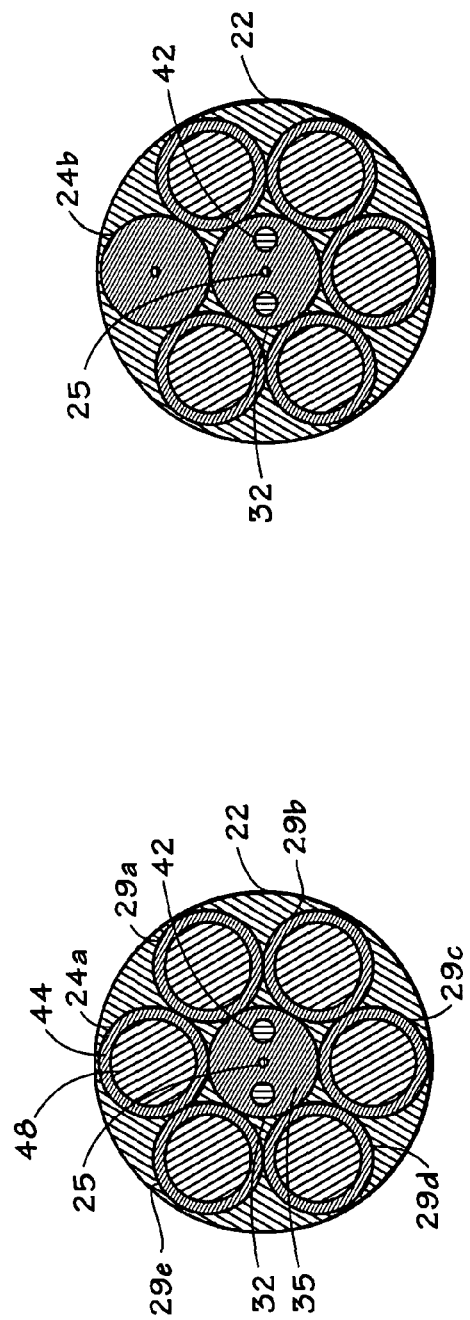

TAPERED FIBER BUNDLE APPARATUS WITH MONITORING CAPABILITY

STATEMENT OF GOVERNMENT FUNDED RESEARCH

The U.S. Government has a paid-up license in this invention and the right in limited circumstances to require the patent owner to license others on reasonable terms as provided for by the terms of Grant No. NRO 000-04-C-226 awarded by the National Aeronautics and Space Administration

BACKGROUND

1. Field of the Invention

The present invention relates generally to fiber optic systems. More specifically, the invention relates to a method and apparatus for monitoring a laser signal in high power optical fiber amplifiers and lasers.

2. Description of the Related Art

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since its introduction in the 1980's, the use of optical fiber in the communications industry has been increasing. Providing a significantly higher bandwidth than its copper wire counterpart, as well as lower losses and less susceptibility to crosstalk, more phone calls are able to be handled and the calls are clearer, especially when they are over long distances. Today, optical fiber is strung around the globe and serves as a backbone for communications such as ground-line telephones, cell phones, cable TV, and networks, including the Internet.

In the 1990's the development of the erbium-doped fiber amplifier (EDFA) further increased the efficiency of fiber optic communications. The EDFA is an optical amplifier made of a glass fiber doped with the rare earth metal erbium. An optical signal may need to be amplified for a variety of reasons. For example, in long runs of fiber, amplification preserves a signal that has been attenuated through losses occurring along the length of the fiber. Additionally, amplification may be used to enable the signal to operate at higher power levels for high power applications, such as laser printing and etching.

Before the development of the EDFA, amplification of an optical signal involved detecting the optical signal, translating it into an electrical signal, and then amplifying the electrical signal. The amplified electrical signal was then converted back into an optical signal for transmission. While there are still opto-electrical amplifiers in use today, optical amplifiers, such as the EDFA are much more prevalent. Many optical amplifiers make use of the physical properties of rare-earth metals such as neodymium, erbium, and ytterbium, for example. These rare-earth metals are doped into an optical fiber which serves as both the signal path and the gain medium. Readily available and inexpensive pump sources, such as semiconductor laser diodes, provide optical energy having wavelengths near 970 nm or 1480 nm. The optical energy is absorbed by the rare-earth metal ions and places the ions in a higher energy state. The energized rare-earth metals subsequently transfer energy to a signal traveling through the doped fiber.

In standard single-mode optical fiber amplifiers, pump light is often coupled into the same single-mode core through which the signal propagates, by the use of single-mode optical coupler devices. However, in an alternate approach known either as a cladding-pumping fiber amplifier or a double-clad fiber amplifier, the pump light is coupled into a larger region known as the inner cladding that encompasses the core but is much larger and can therefore guide more pump light. Such larger area, higher power pumps are readily available and can be utilized to pump single-mode fiber cores to produce very high output powers.

A tapered fiber bundle may be coupled at each end of a cladding-pumped amplifier fiber to couple optical energy from pump sources into the cladding of the doped amplifying fiber. As described above, the power is subsequently transferred to the signal and thus amplifies the signal. The tapered fiber bundles typically include seven or 19 individual optical fibers, but may be manufactured in alternative arrangements and shapes. In a seven or 19 fiber arrangement, the fibers are arranged in a circular pattern around the signal carrying fiber and assuming all fibers are the same size, all fibers are touching in a symmetrical pattern. The signal carrying fiber is a single mode fiber, while the surrounding fibers of the tapered fiber bundle are multimode fibers. The multimode fibers have a larger cross-sectional core as compared to the core of the single mode fiber. The larger cross-sectional area is advantageous to allow for higher power light to couple into the multimode fiber. In turn, this higher power facilitates the transfer of more energy into the single mode fiber and consequently to the signal.

As alluded to previously, high power amplified optical signals may be useful in a number of applications. For example, in Earth-bound communication systems, the high power optical amplifiers are useful for CATV applications in fiber-to-the-home networks. In such networks, a high power signal can be split into hundreds of even thousands of homes to send high speed internet, voice and other signals cheaply. Additionally, besides the many possible uses in conventional Earth-bound communication systems, the signals may be used in communication systems between Earth and satellites, satellite to satellite communications, deep space communication systems, laser printing, LIDAR sensing systems, detection systems and many machining applications.

The propagation of high power laser light through various propagation media incurs many operational obstacles, however. For example, nonlinear effects such as Raman effects, stimulated Brillouin scattering ("SBS") and four-wave mixing ("FWM") are induced and increase along the length of the subsequent signal carrying fiber. Raman effects occur when there are multiple wavelengths of light present in a fiber and the power level is high. In a broad spectrum of short optical pulses Raman scattering shifts the light towards longer wavelengths, thus altering the frequency of the light. SBS occurs as a result of acoustic phonons and can lead to a back reflected signal having a slightly larger wavelength than the signal propagating in a forward direction. These reflections limit the ability of an amplifier to produce high output powers. FWM also occurs when more than one signal is propagating in a fiber. Interaction between the multiple signals creates, among other things, sidebands and modulation instability.

Each of these non-linearities may be more or less prevalent in any given system based on the operating parameters of the system. However, the longer the length of fiber carrying the signals, the more pronounced the non-linearities will be.

While it may be desirable to monitor the output of an optical amplifier to ensure proper operation and to control output levels, coupling a monitor into the signal path adds length to the signal path, and consequently additional non-linearities. Therefore, a system and method for monitoring the output signal without increasing the length of the signal path fiber is needed.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is disclosed a system and method for monitoring power output of an optical amplifier comprising directing a signal through an optical amplifier fiber, pumping the optical amplifier with optical energy through a plurality of pump fibers of a first tapered bundle fiber and a second tapered fiber bundle, utilizing one of the plurality of pump fibers of the second tapered fiber bundle as a monitor fiber, and monitoring the output of the optical amplifier. Alternative embodiments disclosed include replacing a multimode pump fiber with a single mode monitor fiber, and integrating an in-line monitor or coupler into a tapered fiber bundle.

BRIEF DESCRIPTION OF THE DRAWINGS

Advantages of the invention may become apparent upon reading the following detailed description and upon reference to the drawings in which:

FIG. 2 illustrates a tapered fiber bundle of an optical amplifier in accordance with an exemplary embodiment of the present invention;

FIG. 3 illustrates a cross-sectional view of a tapered fiber bundle taken along lines 3-3 of FIG. 2 in accordance with an exemplary embodiment of the present invention;

FIG. 4 illustrates a cross-sectional view of a tapered fiber bundle having a single mode monitor fiber taken along line 3-3 of FIG. 2 in accordance with an alternate exemplary embodiment of the present invention;

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such implementation, as in any engineering or design project, numerous implementation specific decisions must be made to achieve the developer's specific goals, such as compliance with system related and business related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

Figure 1:
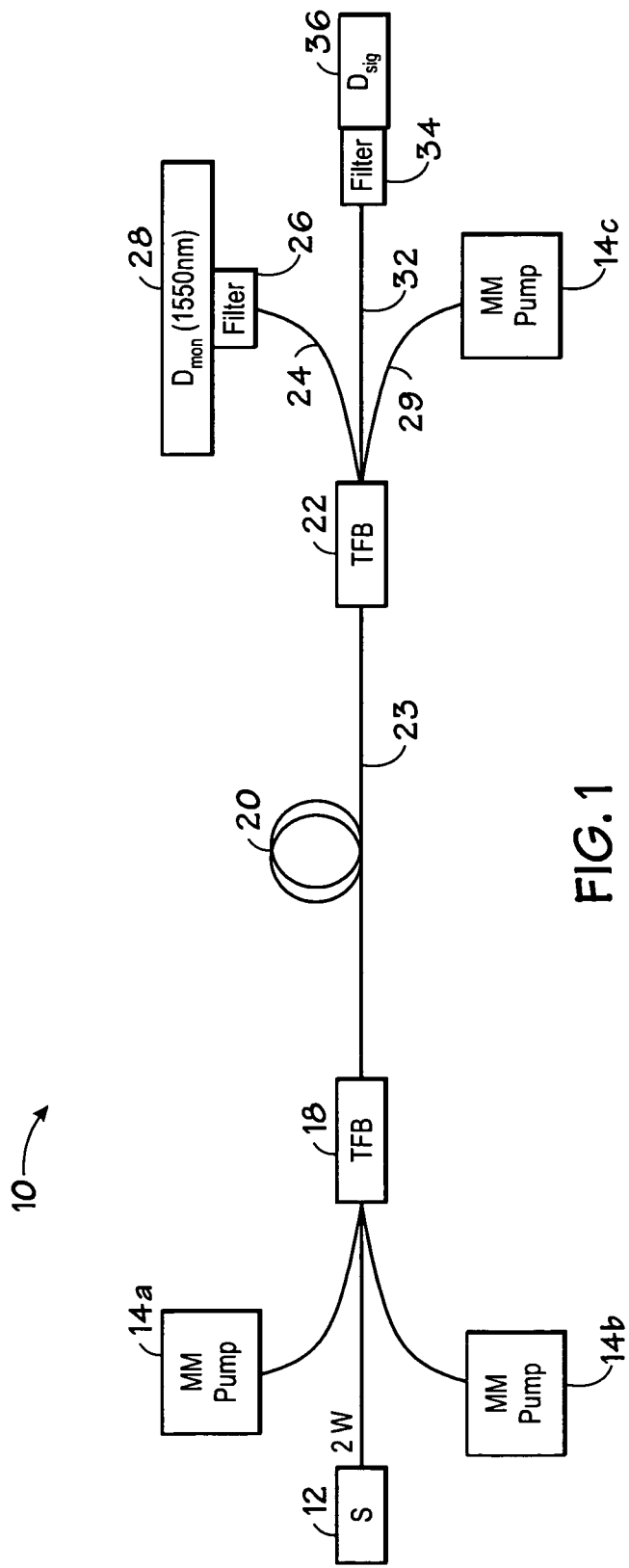
FIG. 1 illustrates an optical amplifier system in accordance with an exemplary embodiment of the present invention.

The output of an optical amplifier may be monitored without extending the length of the signal path in a system using a tapered fiber bundle to cladding pump the amplifier. FIG. 1 illustrates an optical amplifier system in accordance with an exemplary embodiment of the present invention and is designated by the reference numeral 10. The optical amplifier system 10 amplifies a signal 12 that is directed into a tapered fiber bundle 18. The tapered fiber bundle 18 is tapered to efficiently couple multimode pump light into the cladding pumped amplifier. The tapered fiber bundle 18 includes a signal carrying fiber and six multimode fibers, as described in detail in relation to subsequent figures, which are used to carry optical energy common referred to as "pump." The multimode fibers carry an optical power of a designated wavelength from light sources 14a-c. The light sources 14a-c may be semiconductor emitters capable of providing light having wavelengths between 915 and 980 nm and/or 1480 nm. The tapered fiber bundle 18 couples this optical energy from the multimode fibers into the cladding of the signal carrying single mode fiber in order to serve as pump energy in the optical amplifier 20.

The optical amplifier 20 may include silica fiber doped with various rare-earth elements that are useful for transferring optical energy into a signal. For example, erbium and/or ytterbium may be used to dope the fiber of the optical amplifier 20. Throughout the length of the optical amplifier 20, optical energy coupled into the cladding of the optical amplifier 20 interacts with the core and is absorbed by the rare-earth metals. The cladding of the optical amplifier 20 may have a star-shape to provide good modal overlap of the cladding and the core. An optical signal passing through the optical amplifier 20 from the tapered fiber bundle 18 is amplified as the rare-earth metals transfer energy into the signal.

The output end of the optical amplifier 20 is coupled to a second tapered fiber bundle 22, thus, the optical amplifier is pumped from both ends. The tapered fiber bundle 22 has multiple pump fibers 29 coupled to a light source 14c and a monitor fiber 24 coupled to a monitor 28. The pump fibers 29 are multimode fibers and direct pump to the cladding of the optical amplifier 20. The monitor fiber 24, however, does not direct pump into the cladding of the optical amplifier 20. Rather, a small amount of signal from the connection fiber 23 couples into the monitor fiber 24 and the monitor fiber 24 directs that small amount of signal to a monitor 28 so that the output power of the optical amplifier may be monitored.

The monitor fiber 24 may be a multimode fiber with an approximately 100 micrometer core and an optical core to clad index difference of 0.016, giving it a relatively large numerical aperture of 0.22. Numerical aperture is an indication of the light gathering ability of a fiber. Specifically, it indicates the maximum angle at which light may couple into the fiber and propagate within the fiber. Thus, having a larger numerical aperture will allow a greater amount of light to be carried to and measured by the monitor 28. A filter 26 may be used to remove optical power at wavelengths other than the amplified signal that may have coupled into the monitor fiber 24, such as optical power from the pumps 14a-c. This helps insure that only the amplified signal is monitored.

Only a small portion of the amplified signal is coupled into the monitor fiber 24. Most of the amplified signal continues along signal path 32 into a filter 34 before exiting via the output 36 for use according to the specific application. As discussed earlier, nonlinearities occur in high power laser systems and increase according to the distance traveled in the fiber. Using a multimode pump fiber of a tapered fiber bundle as a monitor fiber 24 enables the system 10 to monitor the output signal of the optical amplifier without increasing the length of the signal carrying fiber, thereby precluding the introduction of additional non-linearities.

While FIG. 1, illustrates a system having two tapered fiber bundles, it is not necessary to pump the optical amplifier 20 from both ends in order to monitor the output of the optical amplifier 20. Indeed, it is possible to implement the monitor system using only the second tapered fiber bundle described above.

Turning to FIG. 2, tapered fiber bundle 22 of an optical amplifier is illustrated in accordance with an exemplary embodiment of the present invention. As can be seen, the fibers converge to a bundled region 31 which extends to a tapered region 33. The tapered end of the tapered fiber bundle 22 eventually turns into, or is attached to via splicing or other means, a connection fiber 23 which is coupled to the optical amplifier 20. The tapered fiber bundle 22 has at least one leg of pump fibers 29 coupled to a light source 30, at least one leg 24 connected with a monitor 28, and a center fiber 32 which carries the signal and may also be referred to as the signal path leg.

A cross-sectional view of the tapered fiber bundle 22, taken along line 3-3 of FIG. 2 is shown in FIG. 3. As illustrated in FIG. 3, six multimode fibers 29a-e surround the center fiber 32 which carries the signal. The center fiber 32 is a single mode fiber with a core having a small numerical aperture and cross-sectional area relative to the multimode pump carrying fibers 29a-e. The center fiber 32 may be polarization independent or a polarization maintaining fiber with boron doped stress members 42 to preserve the polarization of the signal. The stress members 42 make up part of the cladding 35 surrounding the core 25 of the center fiber 32. Other forms of polarization maintaining fibers not using stress members but with an elliptical shaped core or elliptical cladding alternatively could be utilized. A low index coating may encapsulate the center fiber 32 to help guide pump light from the multimode pump legs 29a-e into the core 25 of the center fiber 32. The multimode fibers are made of a fluorine doped silica cladding 44 with a silica core 46.

The monitor fiber 24 of the tapered fiber bundle 22 couples light from the center fiber 32 and carries it to a monitor 28 in order to measure the power level of the optical amplifier 20. In addition to measuring the power output of the optical amplifier 20, the monitor may be used to determine the efficiency of the amplifier by comparing the output power level with the amount of energy input into the system. By using a leg of the tapered fiber bundle as a monitor leg, no additional length is added to the signal path. Thus, no additional non-linearities are introduced into the system.

Using a multimode fiber leg 24a as the monitor leg 24 has several advantages. No change would need to be made to the method of manufacturing the tapered fiber bundle 22, except that one of the legs of the tapered fiber bundle 22 would be connected to a monitor 28 instead of a light source 14c. Additionally, the use of multimode fiber 24a as shown in FIG. 3 provides the ability to couple a higher amount of optical power from the signal path as compared to a single mode fiber.

It should be understood that any fibers within the tapered fiber bundle may serve as the signal carrying fiber, pump carrying fiber, or monitor fiber, even though for the purposes of this discussion, the center fiber 32 serves as the signal carrying fiber. It is, therefore, possible to have a signal carrying fiber in an off-center position within a tapered fiber bundle and a monitor fiber in the center position.

In accordance with an alternate exemplary embodiment of the present invention, FIG. 4 illustrates a cross-sectional view of the tapered fiber bundle 22, along line 3-3 of FIG. 2, wherein a single mode monitor fiber is used instead of a multimode fiber. The tapered fiber bundle is similar to the previously described embodiment, however, the multimode monitor leg 24a is replaced with a single mode monitor leg 24b. The advantage of using a single mode fiber 24b instead of a multimode fiber 24a is that it would provide a more stable signal to the monitor by removing undesirable interference phenomenon possible when many optical spatial modes of light propagate in a multimode fiber. The single mode fiber 24b does not allow for as much light to couple into its core, but generally can only carry one mode of light, resulting in a more stable signal.

Figure 5:
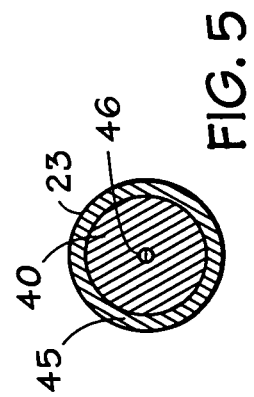
FIG. 5 illustrates a cross-sectional view of a connection fiber taken along line 5-5 of FIG. 2 in accordance with an exemplary embodiment of the present invention

At the tapered end of the tapered fiber bundle 22, all of the fibers have been tapered down and melted together to connect with the connection fiber 23. FIG. 5 illustrates the cross-sectional view of the connection fiber 23 along line 5-5 of FIG. 2. The connection fiber 23 is spliced in between the optical amplifier 20 and the tapered fiber bundle 22. The connection fiber has a circular shaped cladding 40, a low index coating 45, and a core 46 that provides mode matching to the star-shaped doped fiber of the optical amplifier 20. The connection fiber 23 may, however, also have a star-shaped cladding like the fiber of the optical amplifier 20.

Perturbations in the signal path allow for a small amount of the signal to couple into the monitor fiber 24, thus providing the ability for monitoring the amplified signal of the optical amplifier 20. For example, the splicing of the connection fiber 23 between the tapered fiber bundle 22 and the optical amplifier 20 introduce perturbations in the signal path that may cause a small amount of the amplified signal to couple into the monitor fiber 24. Additionally, structural imperfections in the taper, as well as other optical disturbances along the length of the connection fiber 23 and tapered fiber bundle, may cause some of the amplified signal to couple into the monitor fiber 24.

While FIG. 3 and FIG. 4 show seven total fibers making up the tapered fiber bundle, any number of fibers may be used. Typically, the tapered fiber bundles are manufactured with seven or 19 fibers to provide for a maximum amount of fiber surface area to touch when circular fibers are used. Alternative arrangements and shapes are possible, however, and any number of fibers may be bundled together.

Figure 7:
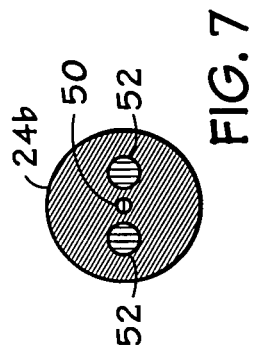
FIG. 7 illustrates a cross-sectional view of a single mode fiber used as a monitor fiber taken along line 6-6 of FIG. 2 in accordance with an alternate exemplary embodiment of the present invention.
Figure 6:
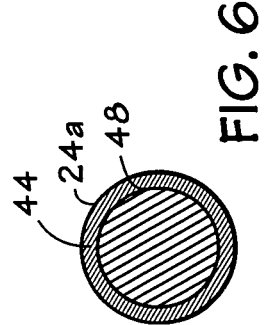
FIG. 6 illustrates a cross-sectional view of multimode fiber used as a monitor taken along line 6-6 of FIG. 2 in accordance with an exemplary embodiment of the present invention.

A cross-sectional view of the alternative embodiments of the monitor fiber 24 is illustrated in FIG. 6 and FIG. 7 in accordance with exemplary embodiments of the present invention. FIG. 6 shows the multimode fiber 24a. The core 48 of the multimode fiber 24a is much larger relative to that of the core 50 of the single mode fiber 24b, providing the capacity to couple more light into its core 48. This results in a greater amount of light being carried to the monitor 28. The smaller core 50 of the single mode fiber 24b, provides the advantage of a more stable signal when compared to that of the multimode fiber 24a. This results from reduced optical interference effects being produced. The single mode fiber 24b may also be polarization maintaining fiber having boron doped stress members 52 to preserve the polarization of the signal.

Figure 8:
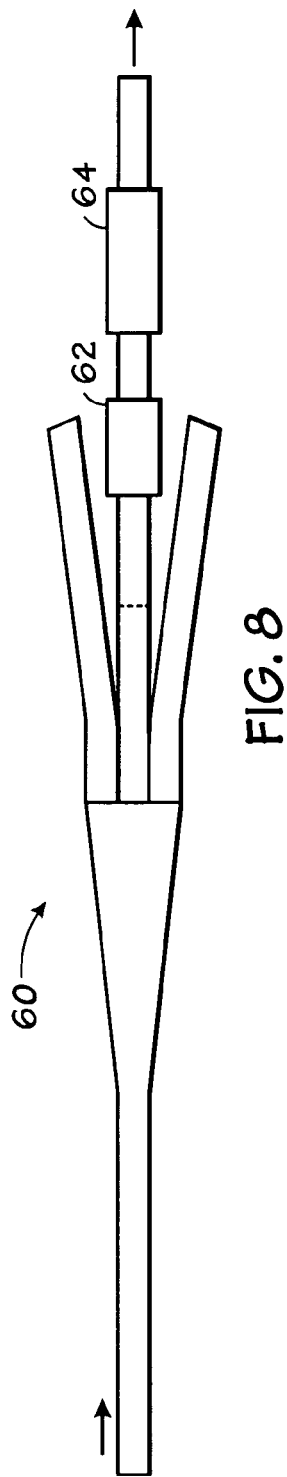
FIG. 8 illustrates a tapered fiber bundle output of an optical amplifier with an in-line monitor according to an alternative exemplary embodiment of the present invention.

An alternative to using one of the legs of the tapered fiber bundle as a monitor leg, is manufacturing the tapered fiber bundle with either a monitor or a coupler to permit monitoring without adding length to the output fiber. FIG. 8 illustrates a tapered fiber bundle with an in-line monitor in accordance with alternative embodiments of the present invention and is designated by the reference numeral 60. The tapered fiber bundle 60, comprises six multimode pump fibers as well as an in-line monitor 64 in the signal output path. The in-line monitor 64 may be any commercially available in-line monitor and is used to monitor the output power and efficiency of the optical amplifier 20. A cladding mode stripper 62 may be inserted into the signal path prior to the in-line monitor 64 to remove modes that may have coupled into the signal carrying fiber from the pump legs. Thus, the monitor 64 only detects the amplified output signal.

The in-line monitor 64 and the cladding mode stripper 62 are integrated into the tapered fiber bundle fiber prior to the tapered fiber bundle fabrication or during manufacture of the tapered fiber bundle 60. Thus, the addition of the in-line monitor 64 and the stripper 62 do not add any length to the output fiber, and, therefore, does not incur additional non-linearities.

Figure 9:
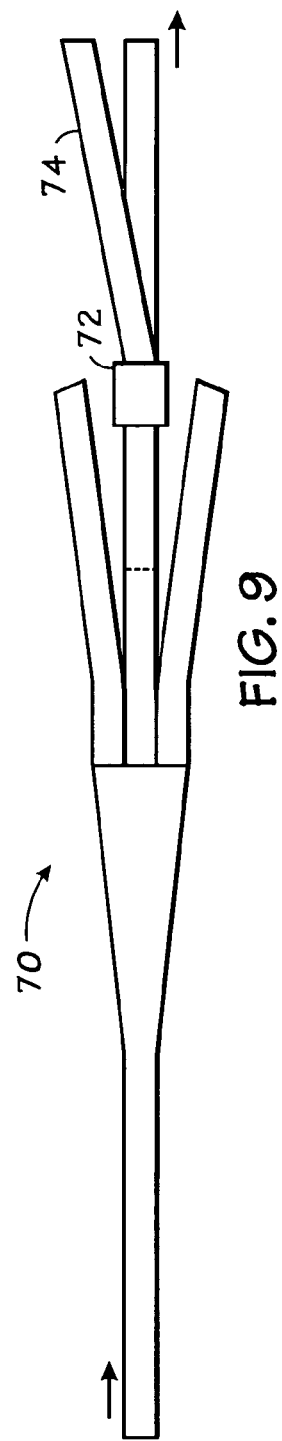
FIG. 9 illustrates a tapered fiber bundle with a coupler in accordance with another alternative exemplary embodiment of the present invention.

Alternatively, FIG. 9 illustrates a tapered fiber bundle with a coupler in accordance with alternative embodiments of the present invention and is designated by reference numeral 70. A coupler, like the mode stripper 62 and the in-line monitor 64, may be integrated into the tapered fiber bundle prior to fabrication. The coupler 72 allows for monitoring of the output signal by splitting off part of the signal. Thus, a monitor leg 72 directs a portion of the output signal to a monitor. Integration of the coupler into the tapered fiber bundle during fabrication helps ensure that no additional and unnecessary length is added to the output signal path.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
  a tapered fiber bundle, having a plurality of fibers coupled to an optical amplifier, wherein the tapered fiber bundle comprises a signal carrying fiber and a plurality of leg fibers, a selected one of the plurality of leg fibers being configured to absorb a portion of a light signal transmitted along the signal carrying fiber; and
  a monitor coupled to the selected leg fiber of the tapered fiber bundle.

2. The system of claim 1, wherein the plurality of leg fibers are multimode fibers.

3. The system of claim 1, wherein the at least one of the plurality of leg fibers coupled to the monitor is a single mode fiber.

4. The system of claim 3, wherein the at least one of the plurality of leg fibers coupled to the monitor is polarization maintaining.

5. The system of claim 1, wherein the monitor is configured to measure a power level of the optical amplifier.

6. The system of claim 1, wherein the monitor is configured to compare an output power level of the optical amplifier with an amount of energy input into the system to determine the efficiency of the optical amplifier.

7. A method of manufacture comprising:
  coupling an optical amplifier fiber to a tapered fiber bundle, wherein the tapered fiber bundle comprises a signal carrying fiber and a plurality of leg fibers, a selected one of the plurality of leg fibers being configured to absorb a portion of a light signal transmitted along the signal carrying fiber; and
  coupling solely through the selected leg fiber of the tapered fiber bundle to a monitor.

8. The method of claim 7, comprising:
  combining the plurality of leg fibers and the signal carrying fiber in the tapered fiber bundle, wherein the signal carrying fiber comprises a single mode fiber and the plurality of leg fibers comprise multimode fibers.

9. The method of claim 7, wherein the at least the one or more of the plurality of leg fibers coupled to the monitor is a single mode fiber.

10. The method of claim 9, comprising integrating a mode stripper into the tapered fiber bundle and coupling the mode stripper in-line with the monitor.

11. A cladding pumped optical amplifier system comprising:
  an optical amplifier fiber comprising a signal carrying fiber;
  a tapered fiber bundle coupled to the optical amplifier fiber, comprising a plurality of leg fibers emerging from the tapered fiber bundle distal an optical amplifier, a selected one of the plurality of leg fibers being configured to absorb a portion of a light signal transmitted along the signal carrying fiber; and
  an optical monitor for measuring optical amplifier power, the monitor optically coupled to the amplifier fiber solely through the selected leg fiber.

12. The cladding pumped optical amplifier system of claim 11, wherein the signal carrying fiber is a single mode fiber.

13. The cladding pumped optical amplifier system of claim 11, wherein the plurality of leg fibers are multi-mode fibers.

14. The cladding pumped optical amplifier system of claim 11, wherein the selected one of the plurality of leg fibers comprises a monitor fiber, and wherein the monitor fiber is a single-mode fiber.

15. The cladding pumped optical amplifier system of claim 11 comprising a second tapered fiber bundle coupled to the optical amplifier fiber.

* * * * *